Nov. 18, 1969　　　　H. C. HOTTEL, JR　　　3,479,580
APPARATUS INCLUDING A CONDUCTIVITY PROBE FOR DETERMINING
THE SALINITY OF WATER
Filed April 22, 1965　　　　　　　　　　　4 Sheets-Sheet 1

INVENTOR.
HOYT CLARKE HOTTEL, JR.
BY Nolte & Nolte
ATTORNEYS

Nov. 18, 1969  H. C. HOTTEL, JR  3,479,580
APPARATUS INCLUDING A CONDUCTIVITY PROBE FOR DETERMINING
THE SALINITY OF WATER
Filed April 22, 1965  4 Sheets-Sheet 2

INVENTOR
HOYT CLARKE HOTTEL, JR.
BY  *Nolte & Nolte*

ATTORNEYS

Nov. 18, 1969  H. C. HOTTEL, JR  3,479,580
APPARATUS INCLUDING A CONDUCTIVITY PROBE FOR DETERMINING
THE SALINITY OF WATER
Filed April 22, 1965  4 Sheets-Sheet 4

$R_T = 13.5K$ @ 70°F ≅ 3.7% S

INVENTOR.
HOYT CLARKE HOTTEL, JR.
BY
Nolte & Nolte
ATTORNEYS

United States Patent Office 3,479,580
Patented Nov. 18, 1969

3,479,580
APPARATUS INCLUDING A CONDUCTIVITY PROBE FOR DETERMINING THE SALINITY OF WATER
Hoyt Clarke Hottel, Jr., Marion, Mass., assignor, by mesne assignments, to The Buzzards Corporation, Marion, Mass., a corporation of Massachusetts
Filed Apr. 22, 1965, Ser. No. 450,147
Int. Cl. G01v 3/02
U.S. Cl. 324—1
1 Claim

ABSTRACT OF THE DISCLOSURE

An apparatus for the determination of the salinity of a body of water including recording and measuring equipment aboard a vessel and a probe containing a sensing device, the probe being launched from the vessel into the water and penetrates the sea to various depths and measures the conductivity of the sea water on a confined path and communicates with the shipboard equipment through a single wire or through a plurality of wires, the probe itself being in electrical contact with the sea water.

---

This invention relates to a measuring and recording apparatus for determining a property of the ocean with respect to depth. More particularly, this invention relates to a measuring and recording apparatus for determining the salinity and density of the ocean and the velocity of sound therethrough at a remote location by means of measuring its conductivity with an improved sensing probe.

In large bodies of water, properties such as temperature and salinity change considerably with respect to depth. There are many reasons why it is desirable to detect and record these properties at different points in the ocean. For example, the existence of low depth liquid layers at a specific temperature can seriously effect the properties of acoustical energy as it is propagated through the water. Likewise the variation in salinity, with respect to depth, can seriously effect the buoyancy of submerged vessels as they are travelling through the water medium. Moreover, the variation in density with respect to depth can affect the propagation velocity of sound through the water. Such property changes can deleteriously effect the performance of equipment and vessels used for both commercial and military purposes.

Various devices and methods have been proposed for the collection of data necessary to accurately determine ocean properties such as temperature, salinity and density over a wide range of depth. Heretofore, the proposed systems have lacked accuracy and the reduction of collected data was time consuming and non-automatic. In addition, the present systems are useful only over limited depth ranges while requiring a speed reduction in the launching ship during the measuring periods.

In the known apparatus for determining the salinity and other properties of any large body of water such as the ocean, it is customary to measure the resistance between a pair of electrodes immersed in the fluid medium by means of a resistance bridge circuit wherein the resistance so measured is proportional to the salinity of the fluid. The electrodes which measure the conductivity of the fluid medium are usually supported by a pair of conducting wires which couple the information back to a resistance bridge or other measuring circuitry. In apparatus employing bridge circuitry, it has been found that if the conductivity of the fluid medium is measured over a period of time, that the resistance of the fluid medium increases slowly with respect to time. This is caused by the chemical ionization of the surfaces of the electrodes in contact with the fluid medium. These surfaces eventually become coated with a non-conductive by-product material thereby increasing the resistivity of the electrodes in contact with the fluid.

It has also been found that changes in the temperature of the fluid medium produce changes in the resistance of the conductors supporting the sensing electrodes in the fluid so as to cause errors in the resistance readings determined by the measuring or bridge circuitry.

Accordingly, the main object of the present invention is to provide an aquatic measuring device which avoids all of the above-mentioned drawbacks.

A more specific object is to provide a deeper and more accurate aquatic measuring device for use with ships moving at high speed in heavy sea conditions while maintaining flexibility of ship maneuvers.

Another object of the invention is to provide a measuring and recording apparatus employing an improved aquatic probe for determining the salinity of water as a function of depth.

It is also an object of the invention to provide an improved aquatic measuring system wherein free falling vertical descent of a probe is insured regardless of the lateral movement of the transporting vehicle.

Yet another object is to provide an aquatic measuring system including means for compensating for errors in depth measurement introduced by temperature variations at different depths.

Another object of the present invention is to provide a measuring and recording apparatus employing an improved aquatic probe for determining the density of a body of water as a function of its salinity, pressure and temperature at a remote location.

Another object of the present invention is to provide a measuring and recording apparatus employing an improved aquatic probe for determining the velocity of sound of a body of water from a knowledge of its density pressure, and temperature at a remote location.

Another object of the present invention is to provide a sensing probe capable of determining the salinity of water utilizing either a one, two or three or more wire conductor.

Yet another object is to provide a salinity measuring apparatus in which all the components are relatively portable and may be easily installed on board ship.

It is also an object of the invention to provide an aquatic measuring system which is simple and reliable.

According to the invention, the above objects are accomplished by use of an aquatic probe which contains a particular sensing element which is deployed from a ship or the like, in combination with a measuring and recording apparatus coupled to the probe by a relatively long conductor. The probe returns electrical signals, indicative of the particular property being measured, to the ship via a conductor which uncoils from both the probe and the ship to minimize the effect of wire deployment on the vertical descent of the probe.

In a preferred embodiment of the invention, the shipboard apparatus includes means for recording signals returned by the probe as a function of depth by correlating the depth of the probe to the probe's constant rate of descent. For the sake of accuracy, a signal may be given the instant the probe hits the water to start the recording apparatus to record at a rate accurately related to the probe's rate of descent through the fluid. The salinity detecting element of the probe may be connected in a bridge arrangement with an additional wire added to the probe and coupled to the sensing means and the bridge in such a manner as to cancel out the effects of the resistance changes in the signal transmitting wire due to temperature variations as the depth increases. On the other hand, the property sensing element in the probe may be connected by a single wire and a sea return path to a known resistance at the measuring and recording apparatus. The variable unknown resistance to be measured is applied through the transmission path with a constant current. Polarity sensing switches are connected in this circuit in such a manner that unipolar current pulses alternately flow through the known and unknown resistances in opposite directions. By measuring the differences in the respective signals passed through the known and unknown resistances, an error signal can be obtained indicative of the property being measured without significant error due to the variations in the resistance characteristics of the transmission path.

The probe includes a plurality of fins which are designed to provide spin to the probe as it descends through the fluid medium in order to stabilize its vertical descent. The probe contains a longitudinally extending hollow tube throughout its center in which is disposed the sensing element for sensing the conductivity of the fluid medium in order to determine its salinity. The hollow tube is open both at the front and rear of the probe to permit the fluid to flow through and around the sensing element contained therein in order that the fluid may come in full contact with the sensing element.

Other objects and features of the present invention will become apparent from the following detailed description considered in connection with the accompanying drawings which disclose the embodiments of the present invention. It should be understood however, that the drawings are designed for purposes of illustration only and not as a definition of the limits of the invention as to which reference should be made to the appended claim.

In the drawings, wherein similar reference characters denote similar elements throughout the several views.

Figure 1:
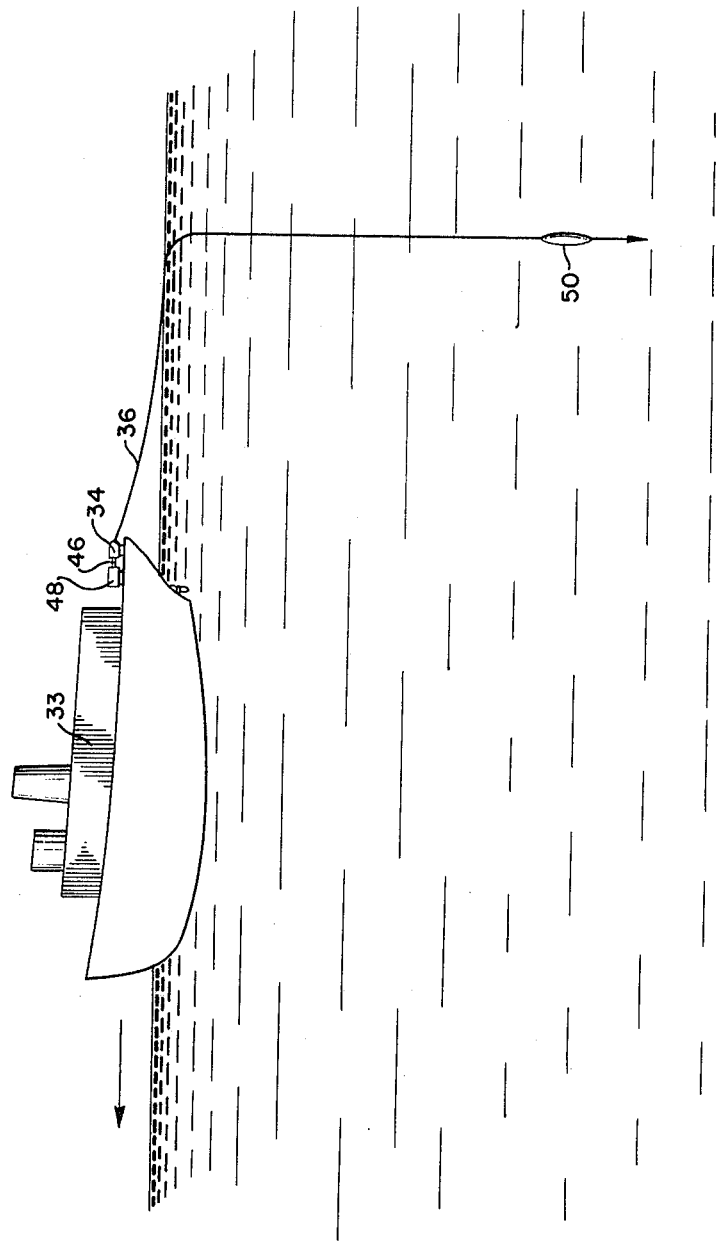
FIG. 1 is a drawing of an expendable ballistic probe according to the invention launched from a moving vessel.
Figure 2:
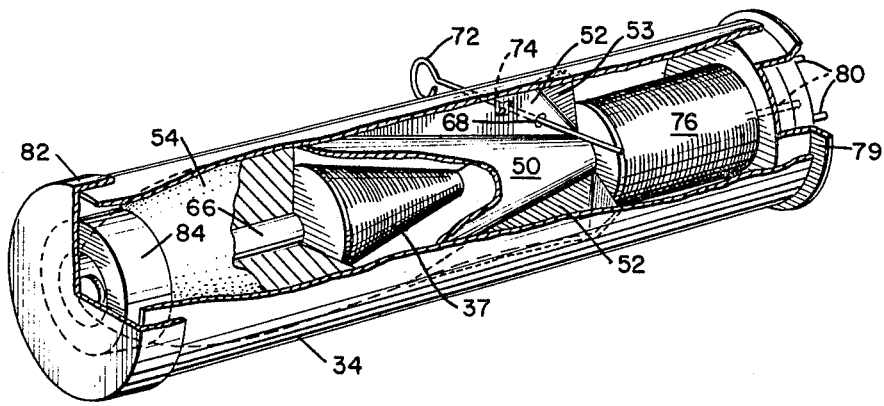
FIG. 2 is a perspective view partly in section, showing the probe located within the launching canister.
Figure 3:
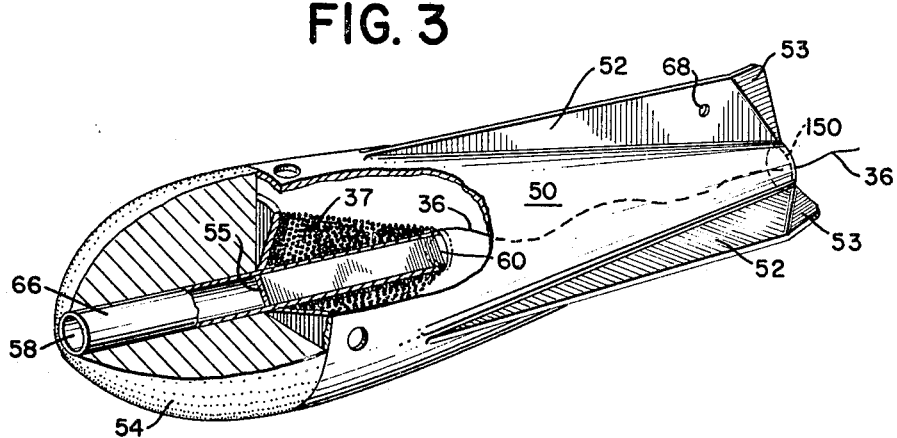
FIG. 3 is a perspective view, partly in section, of the probe shown in FIG. 2.

Referring to FIGS. 1, 2 and 3, the invention includes an expendable probe 50 which is deployed from a moving ship containing the measuring apparatus to which probe 50 is electrically coupled via wire 36. As will become more apparent hereinbelow, one fundamental feature of the invention is the fact that the wire is deployed in both horizontal and vertical directions to thus minimize the effect of wire deployment on the probe's descent. The apparatus according to this invention relates to a salinity measuring device; however, it should be understood that a system as described may be utilized to measure the temperature, pressure, speed of sound, light conductivity, density, etc. of the ambient liquid. Thus, the aquatic device described herein may be employed in a variety of liquid property measuring capacities.

In the present invention, a system is described which provides for the continuous measurement of the salinity of the ambient liquid relative to its depth.

A cable spool assembly canister 34, positioned aboard the signal-receiving ship 33 allows cable 36 to be freely payed out to thereby provide for the horizontal motion of the ship. Cable 36, stored within probe 50 upon spool assembly 37, is freely payed out through opening 150 to thereby provide for the vertical motion of probe 50. It can be readily understood that by positioning a cable spool within the housing of the probe and another spool assembly 76 in canister 34 aboard a moving ship, a means is provided which allows the probe to fall freely since the cable holding the probe does not move in relation to the water in either a horizontal or vertical direction. This phenomenon is effected because the unwinding of the cable from spool 34, located aboard the ship compensates for any horizontal motion of the cable with respect to the water and the cable being payed out of the probe eliminates any vertical motion of the cable with respect to the water. Thus the cable represented by the line in FIG. 1 does not move with respect to the water in either a vertical or a horizontal direction.

In the present invention the system parameters involved are the continuous measurement of salinity with depth. Thus as the probe descends through the liquid, the salinity of the liquid changes with the change in depth. These changes in salinity are sensed by the change in the resistance of the sensing element 66 contained in the probe exposed to the surrounding liquid. The signals representing the resistance values sensed by the sensing element are transmitted through conductor 36, through conduit 46 to the shipboard receiving equipment 48. It is essential, therefore, in the context of the present invention that the depth of the liquid through which the salinity probe is passing at any particular instant be accurately known. The rate of descent of the missile may be determined empirically to thereby allow the depth of the probe at any particular instant to be calibrated through the utilization of a time-scaled recording. Thus, the salinity of the liquid at a particular depth may be accurately determined.

From the foregoing it may be understood that any horizontal or vertical movement of the cable relative to the water would seriously impair the accurate determination of the depth of the salinity probe because the velocity of the missile would vary due to the unpredictable frictional resistance of the cable caused by any movement of the cable relative to the water. Since, as explained above the present invention provides a relatively stationary cable which does not add any significant friction to the system, this problem has been obviated. Thus, reducing the friction of the system to a minimum and providing a truly free-falling salinity probe is one primary feature of the invention. The application of this concept results in a freely falling body whose velocity is not affected by the cable attached to it since the cable is not dragged through the water but as a result of being payed out by the missile and by the receiving vehicle remains stationary with respect to the water.

In the event that the present invention is to be utilized by deploying it from a stationary carrier such as a dock or a stationary ship the second play-out spool 76 will not be necessary. Thus the end of the cable may be attached directly to the receiving equipment and the salinity probe dropped straight down into the water. The play-out spool 37 located within probe 50 will again provide for a freely falling object. Cable 36 therefore, will not offer any resistance to the water because it will remain stationary relative to the water, thereby providing for a more linear and predictable rate of fall for the salinity probe.

It should be noted that by designing the salinity probe for positive rather than negative buoyancy the system may be adapted to work in reverse. Thus the probe could be released from a submerged location, for example from a submarine, and will rise vertically up through the water with the cable 36 being payed out through the rear of the probe.

A significant feature of the invention resides in the system which utilizes the information gathered by the expendable probe to enable the measurement of salinity as a function of depth. Various problems arise because of the fact that the missile deploys a great length of wire during its descent. Thus, if the ship is moving at a high rate of speed it is desirable that the vertical descent of the probe be as rapid as possible to minimize the length of wire deployed for the sake of accuracy as well as for economic reasons. For example, if copper wire is selected, the effect of the temperature coefficient of resistivity is significant over the range of temperatures encountered by the probe during its descent. Thus, the errors introduced by the varying resistance of the copper wire as temperature of the water changes, might normally appear as changes in the sensing element's resistance, which would introduce errors into the measuring circuits. This drawback may be avoided by including circuitry adapted to compensate for the effects of temperature changes on the conductor 36.

The specific embodiment of the probe of FIGS. 2 and 3 consists of a rear, cone-shaped member including three stabilizing fins 52 and a forward bullet-shaped lead weight nose 54. The rate of descent of the probe is controlled by its manufactured weight and close dimension. Small manufacturing errors cause asymmetrical pressure gradients which in turn result in a path of descent which is not vertical. Compensation for this error is achieved by offsetting the end portions 53 of fins 52 to cause the probe to rotate about its vertical axis. The offset provides the probe with vertical stabilization and assists in unreeling wire 36.

As shown in detail in FIG. 2, the probe is housed within canister 34 prior to its deployment from the moving vessel.

One of the fins 52 includes an aperture 68. Canister 34 also includes an aperture 74 so that a lanyard pin 72 may be inserted through apertures 74 and 68 to secure the probe until deployment. The probe is positioned immediately in front of a stationary wire coil wound around a spool 76, which includes a rearwardly extending radial flange 79 to engage the end of canister 34. A plurality of connector pins 80 are used to couple the entire assembly to the shipboard electronic equipment. The forward extremity of canister 34 is closed by means of a cap 82 and includes a rubber bumper 84 to protect the probe prior to its use.

In the embodiment of FIG. 3, a dielectric sensing element including a plastic tube 66 has been inserted into nose 54 of probe 50 and extends longitudinally along the axis of descent of the probe and terminates at end 60 of conical spool 37 of wire coiled within the body of the probe. Located approximately mid-way between ends 58 and 60 of the tube 66 is a sending electrode 55 which may be constructed from either a thin metallic bar or from carbon or graphite rod, and is supported within the plastic tube element 66 in a manner so as to permit the fluids to flow freely therearound. The sensing electrode 55 is coupled to conductor 36 which is coiled around spool 37 within the body of the probe. The conductor may consist of a single wire or a plurality of wires which facilitate the transmission of the conductivity information sensed by sensing element 66 within the probe.

Sensing electrode 55 located mid-way along the length of the plastic tube determines the salinity of the sea by measuring the effective resistance from electrode 55 along the paths which connect to the sea at each end 58 and 60 of tube element 66. It is desirable to make the resistive paths of equal length and in contact with the common sea at ends 58 and 60 as shown so that electrode 55 connected to conductor 36 effectively measures the conductivity of two equivalent parallel resistors connected together at one end to conductor 36 and "grounded" at their other end to the sea. Thus, the measuring apparatus connected to the other end of conductor 37 has the advantage of averaging the resistance of these paths for each of the measurements made during the descent of the probe. Moreover the flow of fluid through the plastic tube as the probe descends has the advantage of washing sensing electrode 55 free of deposits or gases which may adhere thereto. Moreover the steady flow of fluid through the tube provides the sensing element with an instantaneous sample of the sea corresponding to every foot of depth that the probe travels through. Thus the probe constructed with the above-named features according to the invention has the advantage of providing instantaneous and accurate readings of the salinity of the fluid in which it is deployed. The scope of this invention is not to be limited to the use of this probe in conjunction with a single wire conductor. It is equally conceivable that a two, or three or more wire conductor may be employed in conjunction with a resistance bridge measuring circuit such as described in copending application Ser. No. 342,338, filed Jan. 31, 1964. The bridge measuring circuit in the above referenced application also provides compensation for errors in depth measurement introduced by temperature variations affecting the wires at different depths.

SINGLE WIRE MEASURING SYSTEM

Figure 4:
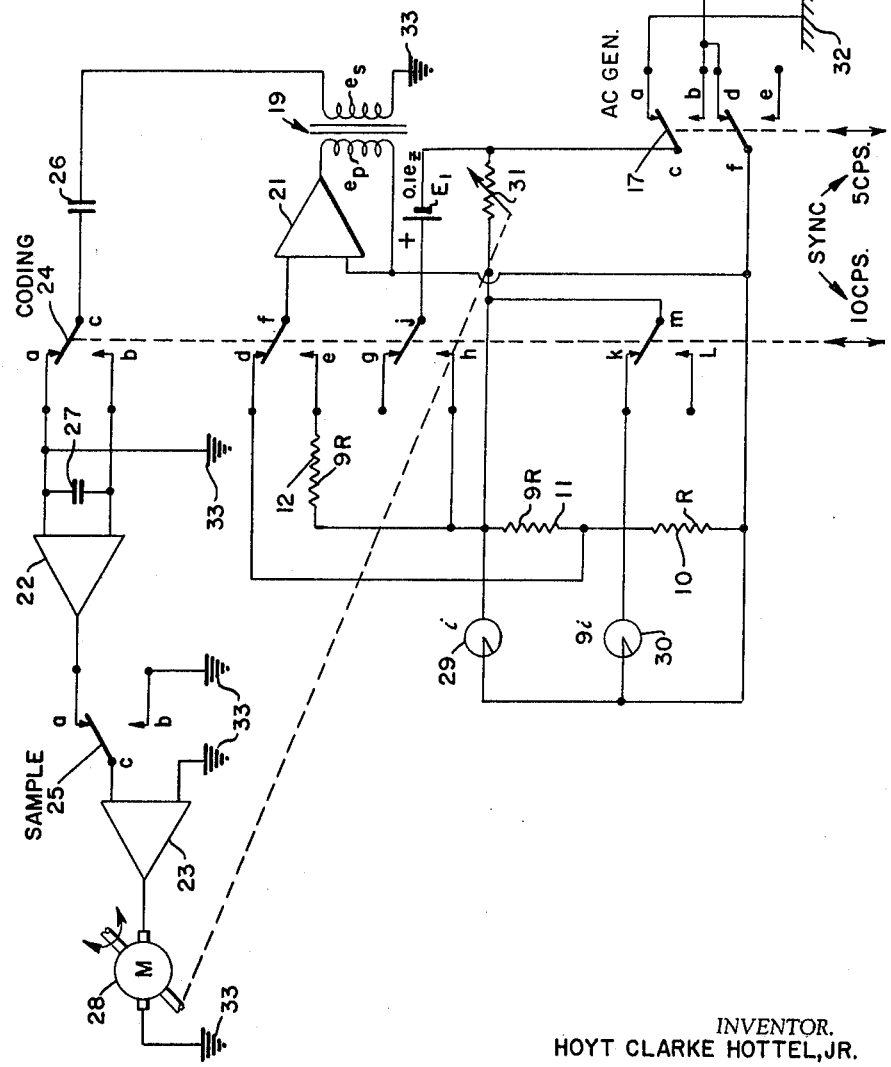
FIG. 4 is a schematic diagram of the electronic circuitry used in conjunction with the probe for a single wire system.

The use of a single wire probe for salinity measurements is made complex by the necessity of applying a symmetrical A-C current through the sensing element 55 during the salinity measurement. The need for an alternating current through the element results from the ionizing effect which would occur in the element if the current through it were not periodically reversed in polarity. FIGURE 4 discloses a schematic diagram of a measuring and recording device capable of determining the salinity of the water from a probe having a single wire conductor. The probe is represented by sensing element 66 having sensing electrode 55 disposed midway within. The conductivity of the sea along the two resistive paths of element 66 is represented by resistors 13 and 14, connected at their intersections to electrode 55, and "grounded" at their ends in sea return path 32. A pair of Zener diodes 15 and 16 are connected back-to-back between element 55 and sea return 32 and serve to limit the voltage applied across resistive paths 13 and 14 to a maximum value of $e_z$ for either polarity of voltage. Zener diodes 15 and 16 are physically contained within the body of probe 50 (not shown) and are "grounded" to the conductive weighted head 54 of the probe. The large surface area of the head in contact with the sea provides an effective sea return path 32 for the diode connection. It is obvious that the other end of the diode pair may be physically connected to either electrode 55 or to the end of conductor 36 coupled to the electrode. Conductor 36, connected to both sensing electrode 55 and diodes 15 and 16, is represented by its equivalent resistance 18, and is connected to chopper 17. Chopper 17, having contacts $a$ and $e$ grounded to seapath 32, provides for the periodic change in the polarity of the current applied to conductor 36 by the alternating motion of contacts $17c$ and $17f$. In a preferred embodiment of the invention, the chopper contacts are alternated at 5 cycles per second. At higher frequencies of alternation, the capacitance reactance between line 36 and the sea, especially over a long length of the conductor, can seriously affect the stability of the salinity measurements.

A pair of constant current generators 29 and 30 are provided and are selectively connected by a second chopper 24 to line 36. Current generator 30 produces a current having a magnitude nine times that of generator 29.

Chopper 24 operates at twice the rate of chopper 17, so that during part of the half of each cycle of operation of chopper 17, the current through the system is increased by a factor of ten.

The increase in current causes Zener diodes 15 or 16, in parallel with sensing element 55, to reach the Zener voltage $e_z$, so that the variation in applied voltage is due only to the resistance 18 of conductor 36, and the sea return path between the probe and the measuring circuitry.

When the chopper 17 is in the position shown in FIG. 1, so that contact 17c connects to 17a, and contact 17f connects to 17d, a total current of 10i produced by the combined outputs of constant current generators 29 and 30, flows through resistor 18 and variable resistor 31. This current produces a voltage drop across the parallel resistive combination of resistors 13 and 14, until this voltage reaches the value of the Zener voltage $e_z$. This voltage is placed across the voltage divider consisting of resistors 10 and 11 so that a voltage equal to $.1e_z$ will be applied to the input of unity gain amplifier 21 through impedance matching resistor 12. The output of amplifier 21 is coupled across transformer 19 to charge capacitor 26 to a voltage having the value of $.1e_z$. When second chopper 24 changes its mode so that contact 24m connects to 24l, 24j connects to 24h, 24f connects to 24e, and 24c connects to 24b, a current of i from generator 29 flows through D-C voltage source $E_1$ producing a voltage of $0.1e_z$, resistor 18 and the parallel combination of resistors 13 and 14. The voltage produced across resistors 13 and 14 is below the Zener voltage of diodes 15 or 16. The resultant voltage is connected to the input of amplifier 21, so that capacitor 26 will be charged to this voltage through transformer 19 and capacitor 27. During the two phases of operation of chopper 24, capacitor 27 will be charged to the absolute difference of the voltages to which capacitor 26 is charged during these two phases. The difference voltage across capacitor 27, will be conducted through amplifiers 22 and 23. When switch 25 is in the conducting position shown in FIG. 1, with contacts 25c connected to 25a, the output voltage of amplifier 23 in turn drives servo control motor 28 which is mechanically coupled to the wiper arm of variable resistor 31. The resultant value of resistor 31 selected satisfies Equation I for the two phases of operation of the chopper 24. The derivation of equation is obvious from the summation of the voltage drops across the circuit parameters selectively coupled to the current generators for the two phases of operation of chopper 24. Moreover, it can be seen that the same results are obtained when chopper 17 is operated the opposite phase from that illustrated so that the current applied to conductor 37 is reversed in direction.

The equation which now applies to the system is:

$$0.1[10i(R_{31}+R_{18})+e_z]=0.1e_z+iR_{18}+iR_C \quad (I)$$

where $R_C$ represents the equivalent resistance of the parallel combination of resistive values 13 and 14.

Clearing and combining the terms of the above equation it is found that:

$$R_{31}=R_C \quad (II)$$

Therefore, the value of the variable resistor 31 is now equal to the resistance $R_C$ which represents the conductivity of the water from which the salinity can be determined. The value of resistor 31 can be now read directly from a dial placed on the potentiometer shaft, in a well-known manner. The measuring circuitry employed is similar to the measuring and recording circuitry disclosed in copending application Ser. No. 395,712, filed on Sept. 11, 1964.

TWO-WIRE SYSTEM

Figure 5:
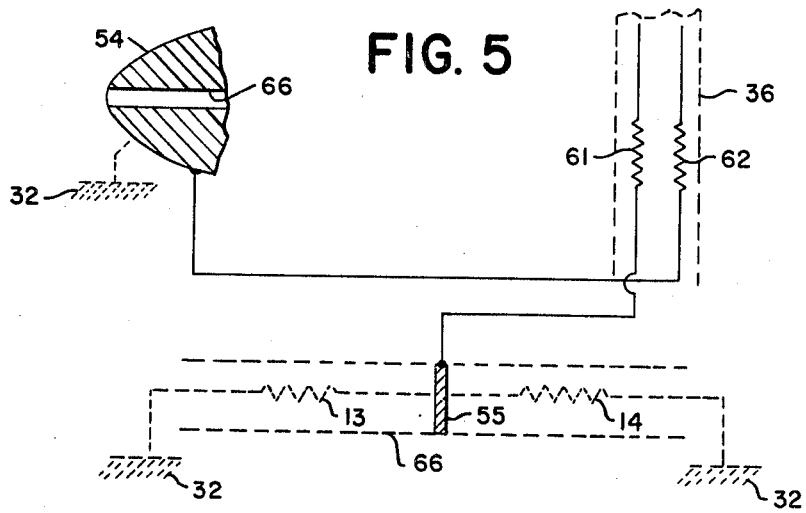
FIG. 5 is an electrical schematic of a two wire sensing probe.

FIG. 5 is an electrical schematic diagram of the probe of FIG. 3 adapted for use with a two-wire measuring and recording system. Conductor 36 is illustrated as having two wires contained within whose resistances are represented by resistors 61 and 62. Wires 61 and 62 may be bonded together within conductor 36 so they will experience the same environmental changes. Wire 61 is connected to sensing electrode 55 mounted centrally in tube 66. The resistive paths from electrode 55 to the sea 32 are represented by resistances 13 and 14, drawn in dotted lines. Wire 62 is connected directly to the conductive nose 54 of the probe. The outer surface of nose 54 is in electrical contact with the sea around it as the probe descends and thus is also shown connected to sea 32.

Figure 6:
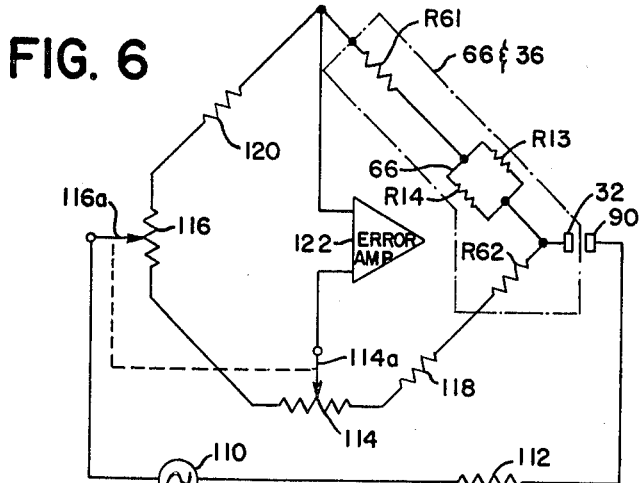
FIG. 6 is an electrical schematic of an A-C bridge circuit for measuring the response of the probe of FIG. 5.

FIG. 6 is an electrical schematic diagram of an A-C bridge measuring circuit for use with the two-wire sensing probe of FIG. 5. An advantage of employing the bridge measuring circuit in combination with the two-wire probe is that resistance changes in wires 61 and 62, due to temperature differentials in the water, may be compensated for. For practical purposes, it may be assumed that the probe will encounter temperatures ranging from thirty to minus two degrees centigrade. Because of this wide temperature excursion, the significant change in resistance of the deployed wire would normally be confused with changes of resistance of sensing element 55, producing considerable errors. Also of importance is the fact that the gain characteristics of the system will vary due to the variation in the rate of change of resistance of sensing element 66 with respect to temperature. This rate may vary by as much as a factor of five over the temperature range encountered.

The circuit of FIG. 6 is the basic measuring circuit used to linearize the recorder output with respect to temperature by compensating for the above effects. The circuit is basically an A-C Wheatstone bridge and includes a generator 110 for producing a source of voltage having a variable of frequency, and which is connected to a relatively high resistance 112 in series with the sea return path between electrodes 32 and 90, electrode 90 being connected to one junction of the bridge. Resistor 112 should have a relatively high resistance to minimize the relatively slight changes in resistance of the sea return path at different temperatures.

One leg of the bridge comprises the parallel combination of R13 and 14 representing resistors 13 and 14, of sensing element 66 and wire 61 of conductor 36, the impedance of which is illustrated as 61. The leg which balances that leg includes copper wire 62 shown as R62, which compensates for the changes in resistance of wire 61 since both wires are subjected to the identical temperatures and thus the same resistance changes. As noted, the junction of salinity sensing element 66 and wire 62 is coupled to the sea electrode 32 of the probe which is in series with the sea return path and generator 110.

The rest of the bridge or measuring circuit is located in the electronic equipment aboard the ship. The bridge includes variable resistors 114 and 116 having slidable taps 114a and 116a, respectively. A fixed resistance 118 is connected in series with wire 62 and one end of resistance 114. A second fixed resistance 120 is coupled between the ends of wire 61 and variable resistor 116. The output of the bridge is taken from the junction of resistor 120 and wire 61 and slidable tap 114a, and fed to error amplifier 122, which, in a known manner, may be coupled to a servo mechanism (not shown) to record a visible trace of the temperature on the moving chart.

The value of resistor 118 is equal to the minimum resistance of sensing element 66, which represents its resistance at thirty degrees centigrade. The value of resistor 114 is equal to the maximum resistance of element 66 (i.e. its resistance at minus two degrees centigrade) less the minimum resistance of the element. Resistors 116 and 120 are both equal to one-half the value of resistor 114. Slidable taps 114a and 116a are mechanically linked together and have the same shaped curve of resistance versus position. The two taps may be driven in a conventional manner by the servo which controls the recording apparatus so that they are positioned in accordance with the resistance value of sensing element 66.

At any condition of bridge balance, the resistance between tap 114a and the junction of resistors 114 and 118 is equal to the measured resistance of element 66 minus the minimum element resistance, while the resistance between tap 116a and the junction of resistors 116 and 114 will be equal to one-half the difference between the measured resistance of element 66 and the minimum element resistance. It can therefore be shown that the resistance of the bridge arm between tap 114a and 116a is equal to the resistance of the arm between tap 116a and the junction of resistor 120 and wire 61. Similarly, the resistance of the arm including the wire 61 and element 66 (R13 and R14) is equal to the resistance of the bridge arm between the junction of element 66 (R13 and R14) and wire 62 and tap 114a. Hence, it can be shown that for a bridge unbalance due to a change in resistance of element 66, the output of the bridge per degree centigrade varies by a much lower factor (i.e. a factor of "two") over the contemplated temperature range despite the five to one variation in the change in resistance of element 66 with respect to salinity over this range. Additionally, variation in the source impedance of the bridge may provide additional gain compensation since it increases with the increase in the rate of resistance change of element 66.

Error amplifier 122 which senses the changes in resistance of sensing element 66 corresponding to the salinity of the water may be connected to a graphic recording system such as that discussed in copending application, Ser. No. 395,712 filed on Sept. 11, 1964, or the automatic optical recording system of Patent No. 3,401,560 by Samuel A. Francis, wherein either recording apparatus is capable of sensing, through the sea return path, the moment at which the probe enters the water in order to begin recording the measured data with respect to the predicted depth of the probe.

The circuit of FIG. 6 comprises a high impedance A-C bridge measuring circuit producing an alternating signal in sensing element 66 in order to prevent ionization of electrode 66. Moreover, the bridge circuit may include coupling capacitors along wires 61 and 62 or in the arms of the bridge to eliminate EMF voltages produced by possible ionization of elements 66, 32, 54, 90, 61 and 62 with respect to the sea.

It has been observed that the ionization of sensing electrode 55 causes the measuring and recording apparatus connected to the probe to record resistance readings considerably higher than expected for the salinity state of the sea. As the frequency of generator 110 is increased, the effects of ionization on sensing electrode 55 are reduced so that the measured resistance values, corresponding to the salinity, approach the resistance representing that which would be measured in the absence of ionization of the sensing element.

Laboratory measurements of the resistance of a sample of sea water at 70° F. through a path of 36 inches in a U-tube having an inside diameter of 0.161 inch have produced the data of the table, between 5 and 2000 cycles per second.

TABLE

| Frequency (c.p.s.): | Resistance × $10^3$ ohms |
| --- | --- |
| 2000 | 13.6 |
| 1000 | 13.65 |
| 500 | 13.75 |
| 200 | 13.85 |
| 100 | 14.05 |
| 50 | 14.3 |
| 20 | 14.65 |
| 10 | 15.2 |
| 5 | 16 |

Figure 7:
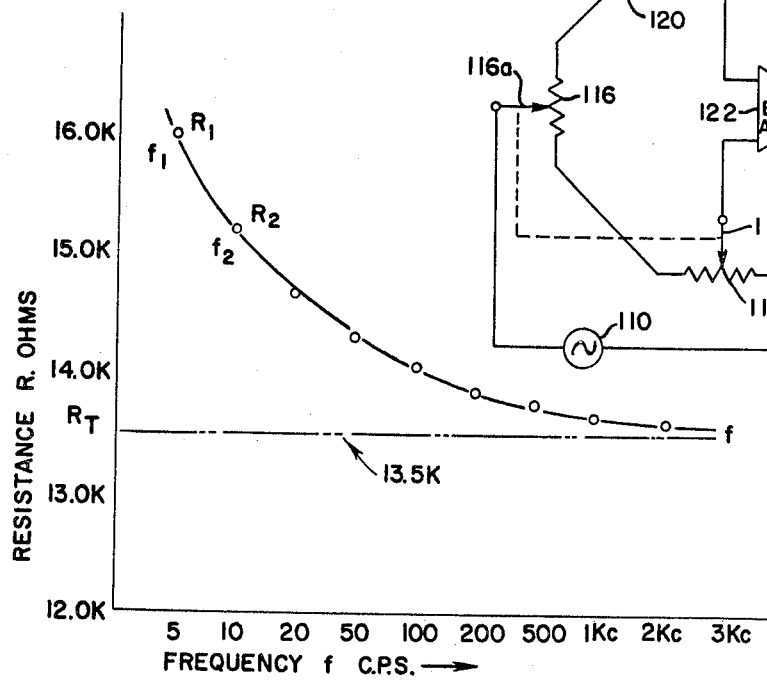
FIG. 7 is a graph illustrating the resistance of the sensing element in the probe as a function of the frequency of measurement by the bridge circuit.

FIGURE 7 is a plot of the resistance of the sample of sea water having a salinity of 3.7% in the above-mentioned test apparatus with respect to the square-wave frequency of the measuring apparatus. At high frequencies of measurement, the resistance approaches true value $R_T$ estimated from the graph of FIG. 7 to be 13.5K ohms, where $R_T$ is independent of the ionization of sensing element 55.

However, in making salinity measurements utilizing a probe having a conductor 36 as long as 6000 feet, it is not possible to effectively operate the bridge circuitry at frequencies greater than 20 cycles due to the capacitance between conductor 36 and the sea. It is desirable to be able to predict resistance $R_T$ from bridge measurements conducted at low frequencies. Various oceanographic publications have indicated that the measurement of the conductivity of the sea with respect to frequency can be represented as follows:

$$R_C = R_\infty + af^{-0.5} \quad \text{(III)}$$

where $R_C$ is the resistance of the sensing element, $f$ is the frequency of measurement, $R_\infty$ is the resistance of the element at $f = \infty$, and $a$ is a constant. Applying Equation III to the results of FIG. 7, the following relationships can be developed for two frequencies $f_1$ and $f_2$, where $R_\infty = R_T$, then, $$R = R_T + af^{-0.5}$$
$$R_1 = R_T + af_1^{-0.5}$$
$$R_2 = R_T + af_2^{-0.5}$$
$$R_1 - R_2 = a(f_1^{-0.5} - f_2^{-0.5})$$
$$a = (R_1 - R_2)/(f_1^{-0.5} - f_2^{-0.5})$$
$$\therefore R_T = R_1 - af_1^{-0.5} = R_1 - \left[\frac{(R_1 - R_2)}{(f_1^{-0.5} - f_2^{-0.5})}\right]f_1^{-0.5} \quad \text{(IV)}$$

From the table where $R_2 = 15,200$ ohms for $f_2 = 10$ c.p.s. and $R_1 = 16,000$ ohms for $f_1 = 5$ c.p.s., and substituting these values into Equation IV, then $R_T \cong 13,300$ ohms. This value agrees to within 1.5% of the value predicted from FIG. 7. It is thus possible to accurately calculate $R_T$ while operating the measuring apparatus at low frequencies so that the true salinity of the sea can be determined.

Moreover, it is posible to calculate the velocity of sound of the water by knowing the water temperature and salinity. In the report entitled "A Simplified Buoyancy Recorder for Submarines" by Allyn Vine, Woods Hole Oceanographic Institute, 1947, various charts have been prepared which enable one to determine the velocity of sound of the water knowing its conductivity (or salinity) and its temperature.

For depth measuring equipment employing Sonar, knowledge of the true velocity of sound of the various layers of water in the sea permits the accurate location of undersea objects. Moreover, the salinity of the sea is proportional to its density so that it is possible to determine the buoyancy of underwater craft through the various layers of the sea.

In the copending applications, referenced herein, a temperature sensing probe employing a thermistor is discussed. It is not outside the scope of this invention to include a temperature sensing element with the salinity sensing element in the same probe, and connect them to a measuring and recording apparatus capable of automatically determining and recording the velocity of sound of the water, as a function of its depth. The velocity of sound may be calculated to within 1 ft./sec. if the sea water resistivity is known to within 3%, an accuracy which is easily realized when utilizing the apparatus according to the present invention.

It is also within the scope of this invention to employ a sensing probe having a three-wire conductor. With respect to the two-wire system, the three-wire probe would employ the third conductor in substitution for the sea return path between electrodes 32 and 90 in FIG. 6. The probe would still have one conductor coupled to nose piece 54 in order to establish a sea return path to start the measuring and recording apparatus when the probe landed in the water.

While only a single embodiment of the present invention has been shown and described, it will be understood that many changes and modifications may be made therein without departing from the spirit of the invention as defined by the appended claim.

What I claim is:

1. Apparatus for the determination of the salinity of a body of water at varying depths from a remote location comprising; a probe immersed in the water, said probe having a body portion in electrical contact with the water, sensing means contained within said probe responsive to the salinity of the water, means remote from said probe measuring and recording the response of said sensing means and conductor means for coupling said measuring and recording means to said sensing means, said probe comprising; a body comprising a section having a plurality of stabilizing fins at one end, and a weighted conductive nose portion secured to the other end of said body and in electrical contact with the water, said sensing means comprising means for sensing the conductivity of the water over a confined path within the probe, said conductivity being proportional to the salinity of the water, said detecting means comprising a dielectric passage extending through said nose and body section along the length of the probe and having open ends in contact with the water adjacent said conductive nose portion, and a sensing electrode disposed within said passageway and coupled to said conductor means for sensing the conductivity of the water paths between said electrode and said conductive nose portion at both ends of the passageway as the probe moves through the water, said measuring and recording means comprising a source of electrical energy, and means electrically coupling said source between said conductor means and said water, whereby said water between said coupling means and said conductive nose portion forms a return path for said source of said measuring and recording means.

References Cited

UNITED STATES PATENTS

| | | | |
|---|---|---|---|
| 2,122,363 | 6/1938 | Christie | 324—30 |
| 2,733,201 | 1/1956 | Thompson | 324—30 XR |
| 2,845,221 | 7/1958 | Vine et al. | |
| 3,143,346 | 8/1964 | Bulow. | |
| 3,147,431 | 9/1964 | Bennett et al. | 324—30 XR |
| 3,214,728 | 10/1965 | Higgins | 324—3 XR |
| 3,221,556 | 12/1965 | Campbell et al. | 73—362 |
| 2,210,205 | 8/1940 | Elliott | 324—2 |
| 2,330,394 | 9/1943 | Stuart | 324—2 |

GERARD R. STRECKER, Primary Examiner

U.S. Cl. X.R.

324—30